(12) United States Patent
Shendge

(10) Patent No.: US 7,293,656 B2
(45) Date of Patent: Nov. 13, 2007

(54) ADJUSTABLE SORTER DISC METHOD APPARATUS AND SYSTEM

(75) Inventor: Devendra Win Shendge, Birdsboro, PA (US)

(73) Assignee: Omega Design Corporation, Exton, PA (US)

( * ) Notice: Subject to any disclaimer, the term of this patent is extended or adjusted under 35 U.S.C. 154(b) by 75 days.

(21) Appl. No.: 10/856,644

(22) Filed: May 28, 2004

(65) Prior Publication Data

US 2004/0238330 A1 Dec. 2, 2004

Related U.S. Application Data

(60) Provisional application No. 60/474,271, filed on May 29, 2003.

(51) Int. Cl.
*B07C 5/00* (2006.01)
(52) U.S. Cl. ............... 209/522; 209/621; 198/396
(58) Field of Classification Search ........... 198/397.01, 198/397.05, 392, 396, 473.1, 479.1; 209/522, 209/621; 221/162, 169
See application file for complete search history.

(56) References Cited

U.S. PATENT DOCUMENTS

| | | | | |
|---|---|---|---|---|
| 2,707,576 A | * | 5/1955 | Fowler | 221/184 |
| 4,075,086 A | * | 2/1978 | Marsh et al. | 209/522 |
| 4,130,194 A | * | 12/1978 | Schindel et al. | 198/397.02 |
| 4,655,338 A | * | 4/1987 | Hershey et al. | 198/395 |
| 5,065,650 A | * | 11/1991 | Anderson et al. | 81/486 |
| 5,549,189 A | * | 8/1996 | Martisala | 198/380 |

* cited by examiner

*Primary Examiner*—Joseph C. Rodriguez
(74) *Attorney, Agent, or Firm*—Eugene E. Renz, Jr.

(57) ABSTRACT

The present invention provides an apparatus for sorting containers commonly referred to as bottle unscrambler. The apparatus has a bowl assembly consisting of a base and an upstanding generally cylindrical sidewall, a support disc, and an actuator disc overlying the support disc. A plurality of pie-shaped disc segments are disposed in a circular array between the support disc and actuator disc, operatively connecting the actuator disc and support disc so that relative rotation of the support disc and actuator disc effects radial movement of the pie-shaped disc segments between inner and outer limit positions thereby providing a means for selectively varying the channel to accommodate containers of various sizes and shapes.

7 Claims, 24 Drawing Sheets

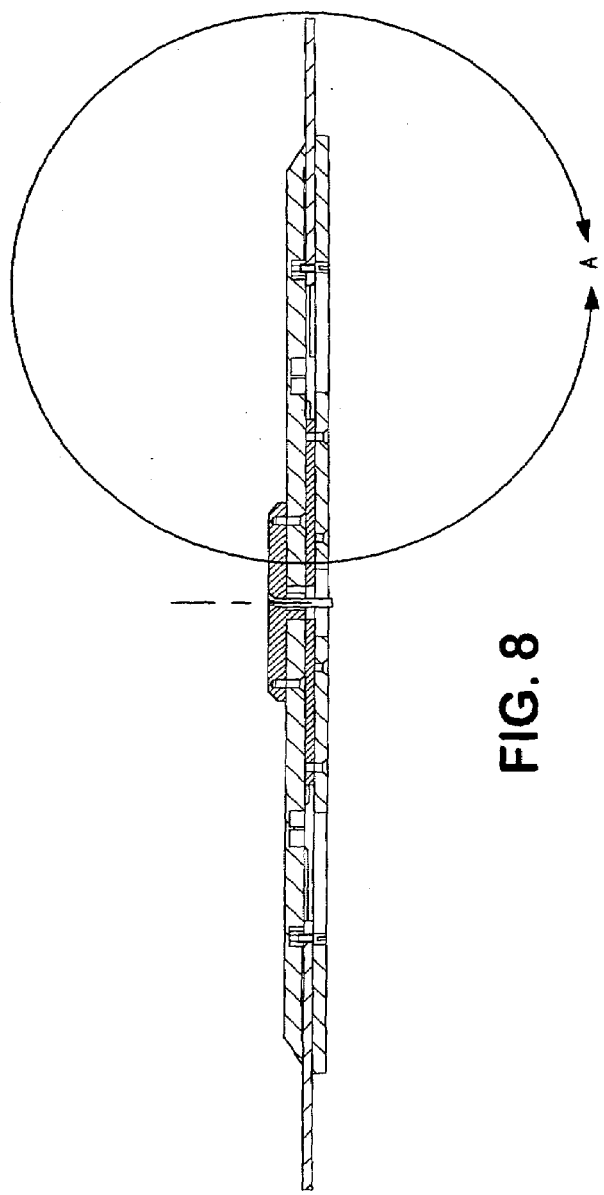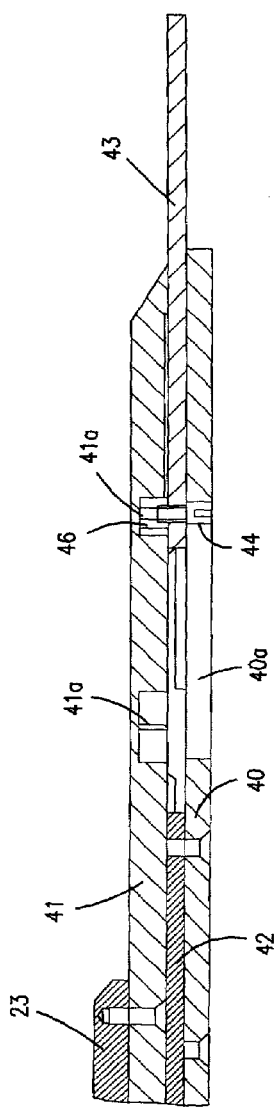
FIG. 8
FIG. 9

ADJUSTABLE SORTER DISC METHOD APPARATUS AND SYSTEM

FIELD OF THE INVENTION

The application claims the benefit of U.S. Provisional Application 60/474,271 filed May 29, 2003, entitled, ADJUSTABLE SORTER DISC.

BACKGROUND OF THE INVENTION

The present invention relates to improvements in so-called bottle unscramblers of the type shown for example in U.S. Pat. No. 4,655,338 issued Apr. 7, 1987, entitled, BOTTLE UNSCRAMBLER, owned by the Assignee of the present invention. The apparatus and system are used in high speed automated systems for cleaning, filling and sealing containers for products such as medicaments and the like. As shown in the '338 patent, the unscrambler system and apparatus comprise a first orienting section wherein plastic bottles are delivered in random fashion to a pre-orientor bowl assembly which sorts and orients the bottles in either a top up or top down single column attitude for delivery through a discharge chute to a so-called rotary pocket assembly which positions the bottles with discharge opening facing up so that the containers can be filled at a filling station downstream of the rotary pocket assembly.

The preorientor bowl assembly comprises a sorter disc mounted in the bowl assembly of a predetermined diameter less than the internal diameter of the cylindrical sidewall of the bowl assembly to define a circumferentially extending channel for orienting the containers or bottles into a single column with top up or top down attitude as described above. Rotation of the sorter disc produces a steady flow of bottles in the channel to deliver them in the top up or top down orientation. For proper operation of the preorientation process, the channel specification has to be adjusted for different sized containers. Accordingly, sorter discs of different diameters and configurations are needed to accommodate bottles of different sizes and shapes. In other words, each sorter disc is of a specific diameter and has a predetermined spacer to provide a proper channel configuration for a given sized container.

As shown in the '338 patent, the preorientor bowl assembly is at some height above the floor or conveyor supporting surface requiring a ladder to access the interior of the bowl assembly to change from one disc to another when the size or shape of the container being processed is changed. This, of course, is time consuming and expensive. Further, these discs are rather heavy and therefore difficult to manipulate to make the requisite change when running a new type of container. It has also been found that some containers deviate from specification sufficiently so that the particular disc for that size container is not suitable to provide the channel configuration needed to process the slightly out of specification containers.

In some other systems, complicated and hard to activate linkages are utilized which interfere with the normal tumbling action in the drum. Further, in these systems, actuators are located in the drum and are not accessible from ground level. Additionally, the actuators require great force to operate and in some instances jam or freeze.

Accordingly, even though these prior systems are generally useful for the purposes intended, they have certain disadvantages and drawbacks which the present invention seeks to overcome.

SUMMARY OF THE INVENTION

The present invention provides an adjustable sorter disc assembly which overcomes the disadvantages and drawbacks of the system exemplified in the '338 patent. In its broader sense, the adjustable sorter disc assembly of the present invention functions to provide a selectively adjustable variable diameter and height. This essentially eliminates the need for specific disc configurations for each container size and shape. The adjustable sorter disc assembly of the present invention comprises a generally circular support disc, an actuator disc and a series of pie-shaped disc segments mounted between the support disc and actuator disc. The pie-shaped segments have an arcuate outer edge portion which in the assembled relation confronts the peripheral cylindrical sidewall of the bowl assembly to define circumferentially extending flow channel or trackway for the bottles. Means including cooperating cam and grooves in the actuator disc and pie shaped disc segments are provided whereby relative rotation of the actuator disc and support disc effects radial displacement of the pie-shaped segments between an inner limit position and an outer limit position so that the gap between the outer peripheral edge of the pie-shaped segments and the cylindrical sidewall of the bowl assembly can be selectively varied.

Novel actuating means is provided for actuating the disc members selectively to produce the diameter changes described and thereby selectively vary the radial gap between the outer peripheral edge of the pie shaped disc segments and the bowl sidewall and thus change the configuration of the channel. The actuator also includes means for adjusting the height of the channel or the distance between the outer peripheral edge of the pie shaped segments and a disc-like drive plate defining a base for the circumferential bottle channel so that the peripheral edge of the pie-shaped disc segments lies generally in a plane through the diameter of the bottle or container to provide optimum operating conditions for movement of the bottles or containers in the channel. The actuating mechanism and controls for effecting the changes in the sorter disc assembly depend from the bottom wall of the bowl assembly so that adjustment of the sorter disc to vary height and gap of the bottle channel in the manner described above is easily accessible by an operator and thereby provides an ergonomically beneficial feature.

The present invention incorporates other features which are described hereafter in more detail including uniquely designed pie-shaped segments having an arcuate outer peripheral edge configuration providing a circumferentially extending essentially circular outer edge of the array of segments throughout the full range of radial displacement between extreme outer and inner limit positions thus eliminating hangup of bottles during operation of the drum which is characteristic of some presently existing systems.

The actuator mechanism includes means consisting of a reduction gear transmission to provide a predetermined mechanical advantage in the manual adjusting operation so that the mechanism can be activated through a handwheel with very little effort. Further the sorter disc assembly is characterized by a novel arrangement of control slots and grooves and complementary cams which interengage internally of the discs comprising the sorter disc assembly so that the outer face of the sorter disc assembly does not provide an obstacle or a hang up to the normal tumbling of bottles which occurs during an operational cycle.

The handwheel and actuator mechanism are located below the drum within easy reach of an operator so that adjustments of the sorter disc assembly to accommodate a change over can be easily accomplished and provide a much safer operation than some of the prior art systems.

BRIEF DESCRIPTION OF THE DRAWINGS

The present invention and the various features and details thereof will be hereinafter more fully set forth with reference to the accompanying drawings, wherein;

FIG. 8 is an enlarged sectional view of the adjustable sorter disc assembly;

FIG. 9 is an enlarged sectional view of the portion of the disc assembly circled in FIG. 8;

DESCRIPTION OF PREFERRED EMBODIMENTS

Figure 1:
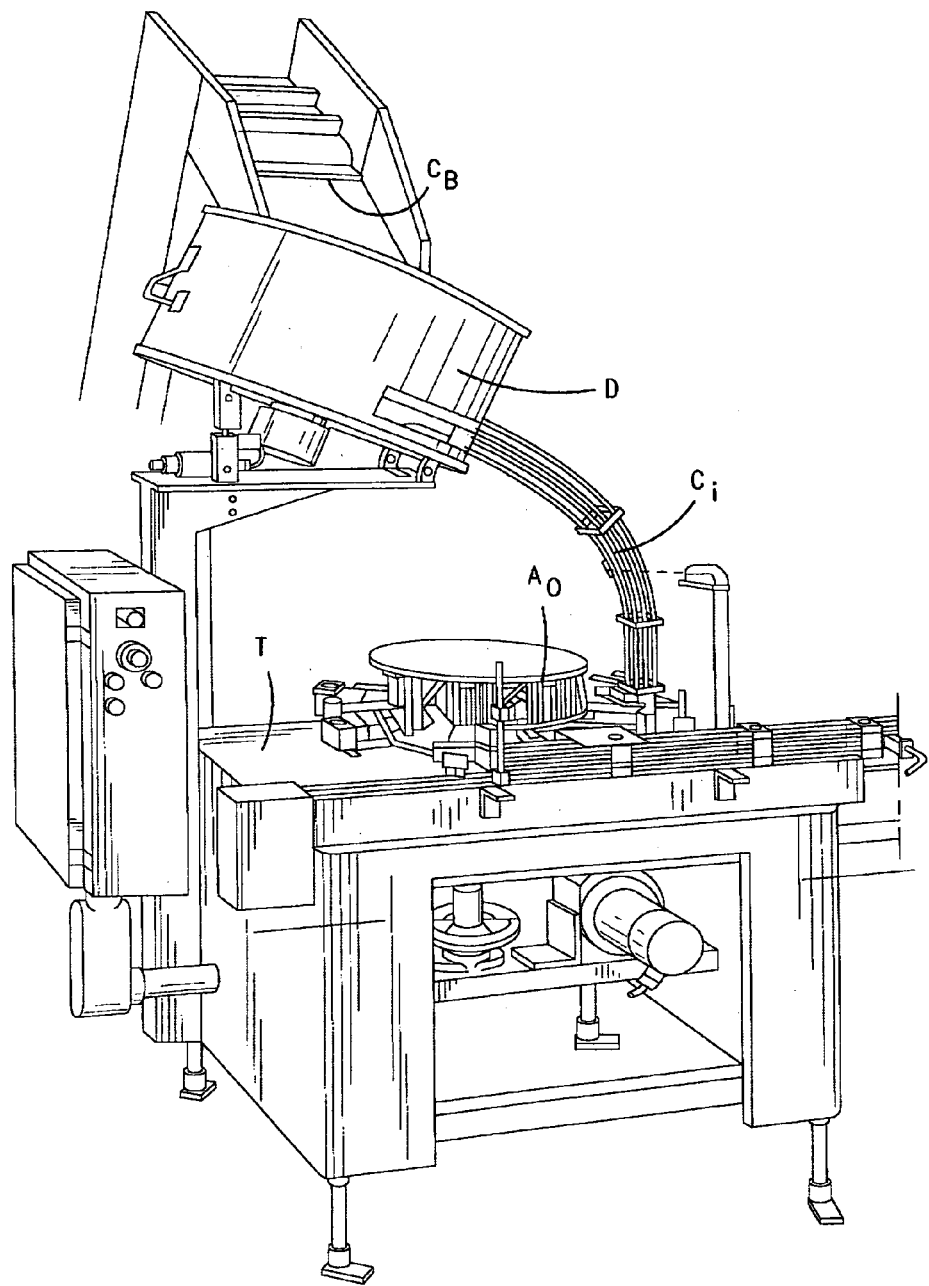
FIG. 1 is a perspective view of the overall system and apparatus of the adjustable sorter disc assembly of the present invention.
Figure 2:
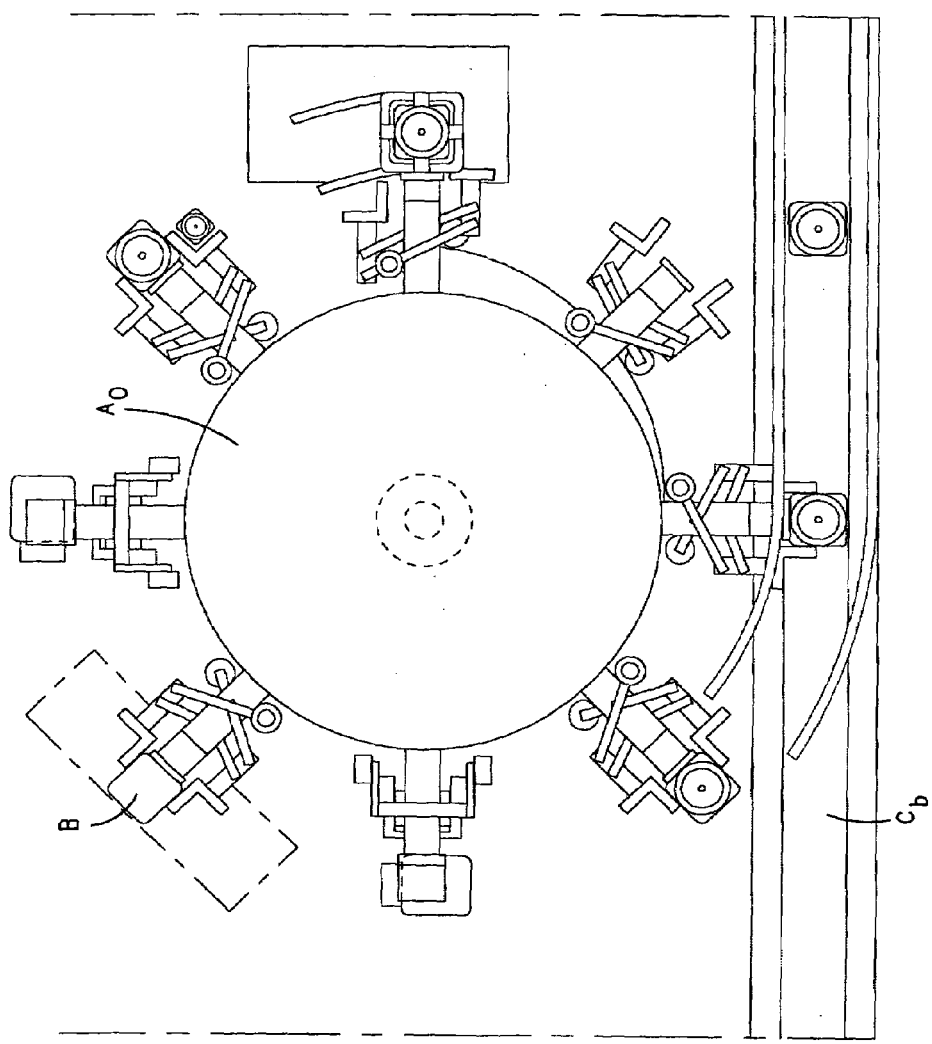
FIG. 2 is a fragmentary plan view of the rotatable turret and its associated pocket assemblies showing the relative positions of the pocket assemblies in different stages in the operation.

Referring now to the drawings, and particularly to FIG. 1 thereof, there is shown a sorter apparatus and system for orienting or unscrambling plastic containers or bottles B. Considering first the broad aspects of the sorter apparatus and system and a typical cycle of operation, plastic bottles (B) are delivered in random fashion by means of a conveyor ($C_b$) into the drum (D) of the adjustable sorter disc assembly (Ds). The sorter disc assembly (Ds) is spaced radially from the sidewall of the bowl (B) to define a channel or trackway (C) for the bottles wherein the bottles (B) orient in an end to end fashion upon rotation of the sorter disc assembly. The bottles (B) unscramble in the drum (D) and are aligned end to end for tangential discharge into a downwardly directed infeed chute ($C_i$).

The sorter is mounted above the bottle orienting mechanism table (T) by a pedestal including adjustment means for tilting the sorter drum (D) at a predetermined angle to provide the necessary negative angular discharge for the bottles (B) to the infeed chute ($C_i$).

Figure 3:
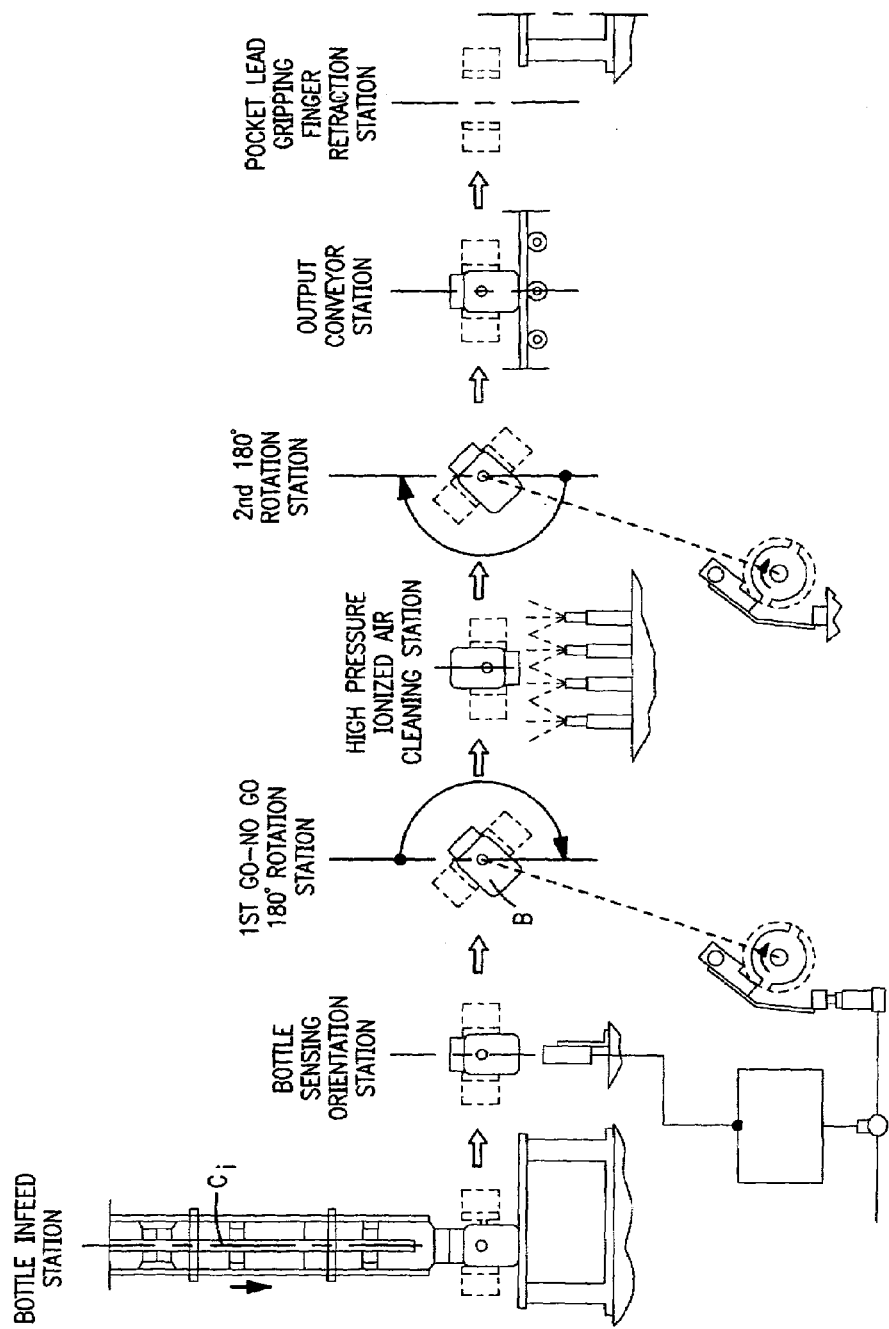
FIG. 3 is a schematic sequential flow diagram showing in side elevation the orientation of the bottle and its associated pockets from an infeed position through bottle orientation.
Figure 4:
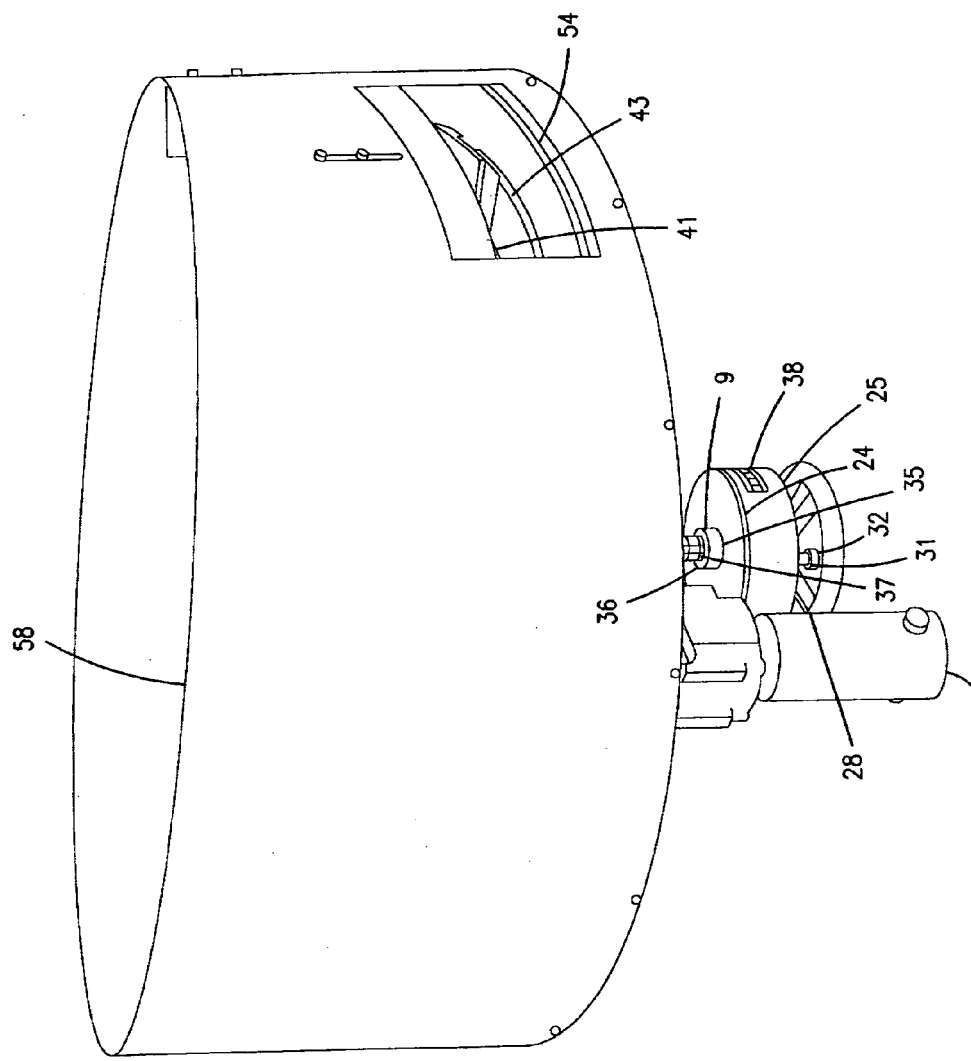
FIG. 4 is a perspective view of the sorter or unscrambler bowl showing the sorter disc assembly of the present invention and the mechanism for adjusting the configuration of the channel to accommodate bottles of different sizes.
Figure 5:
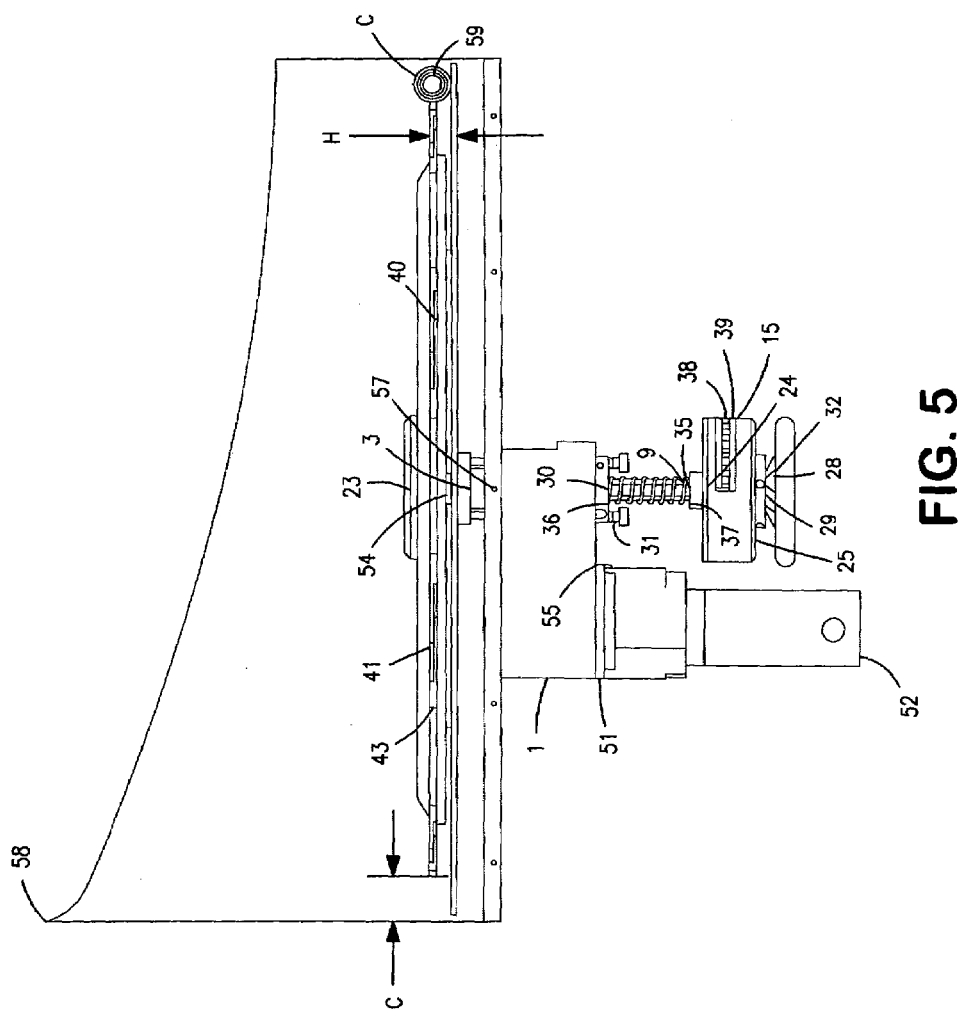
FIG. 5 is a side elevational view partly in section showing details of the adjustable sorter disc assembly of the present invention.
Figure 6:
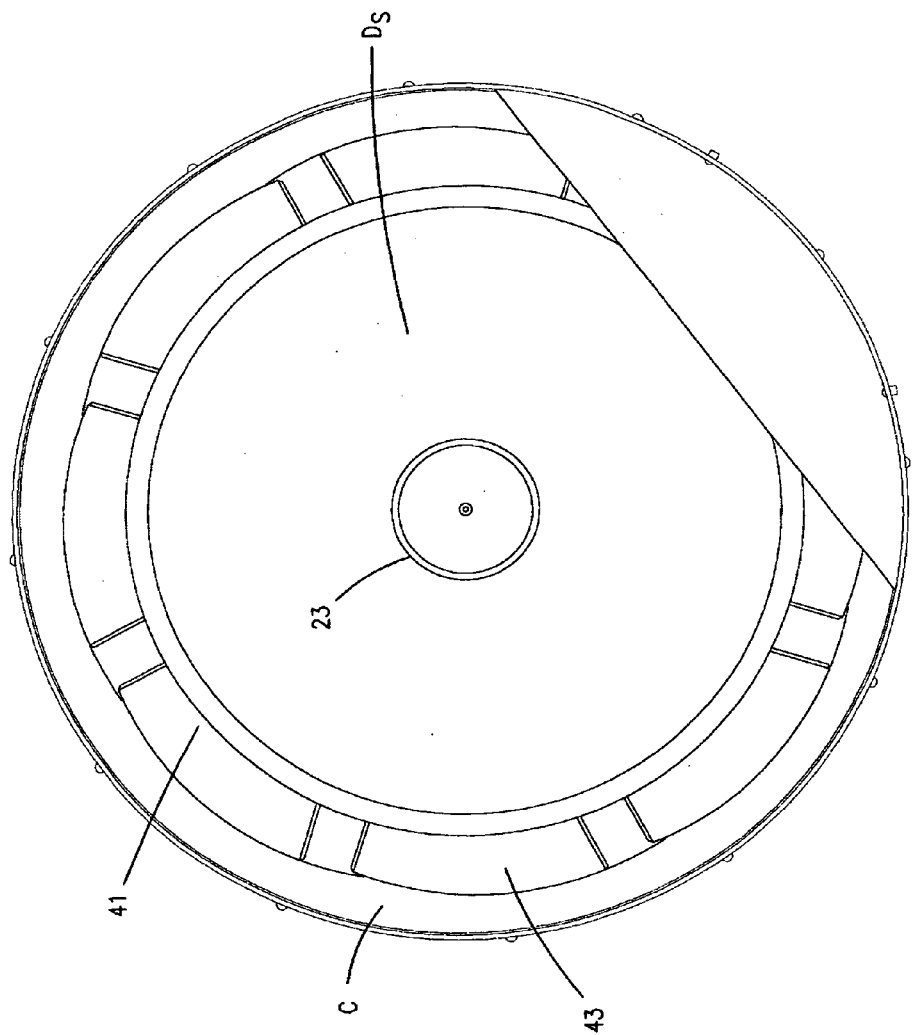
FIG. 6 is a top plan view of the sorter above.

The empty plastic bottles (B) delivered through the infeed chute ($C_i$) are aligned axially but in a random pattern of base to tip orientation. Further orientation to clean, fill and seal the bottles takes place in the orientation apparatus ($A_o$) which is described in detail in the '338 patent incorporated herein by reference. The various functions of the orientation apparatus are shown schematically in FIG. 3 hereof.

The sorter disc assembly (Ds) comprises a series of discs including pie shaped segments which are selectively actuable by actuator mechanism ($M_a$) to effect relative rotation of the discs to displace the pie-shaped sections or segments radially and thereby adjust the radial gap (G) of the channel (C). The actuator mechanism ($M_a$) also includes means for adjusting the height (H) of the sorter disc assembly (Ds) thereby providing a means for selectively changing the characteristics of the channel (C) to accommodate containers of different sizes and shapes. As detailed hereafter, the actuator mechanism ($M_a$) is easy to access from below the drum (D) so that the sorter can be easily and quickly changed to accommodate containers of different sizes and shapes without disassembly of parts or replacement of sorter discs specially designed for a given container size or shape.

Figure 10:
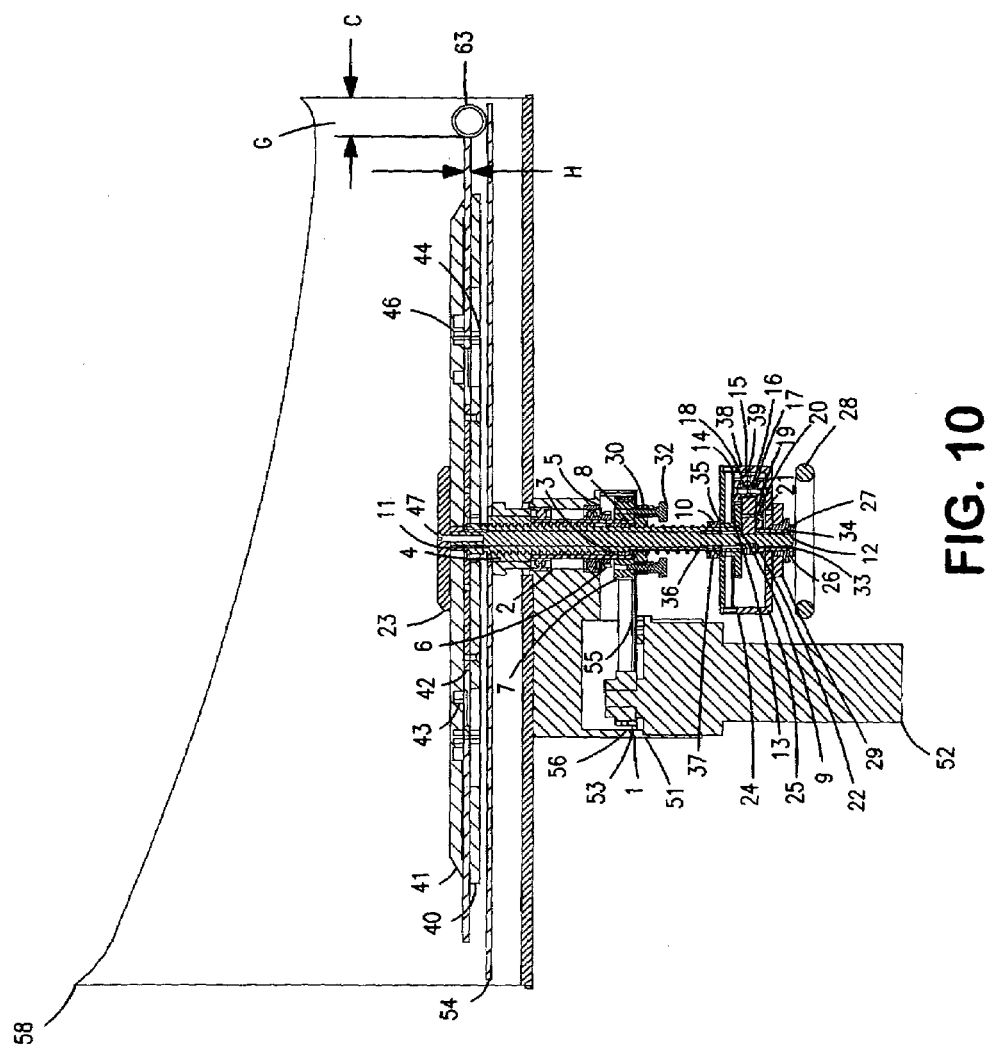
FIG. 10 is a transverse sectional view showing the internal components of the mechanism for rotating the sorter disc assembly and for selectively varying the configuration of the channel for bottles oriented in the bowl assembly.
Figure 11:
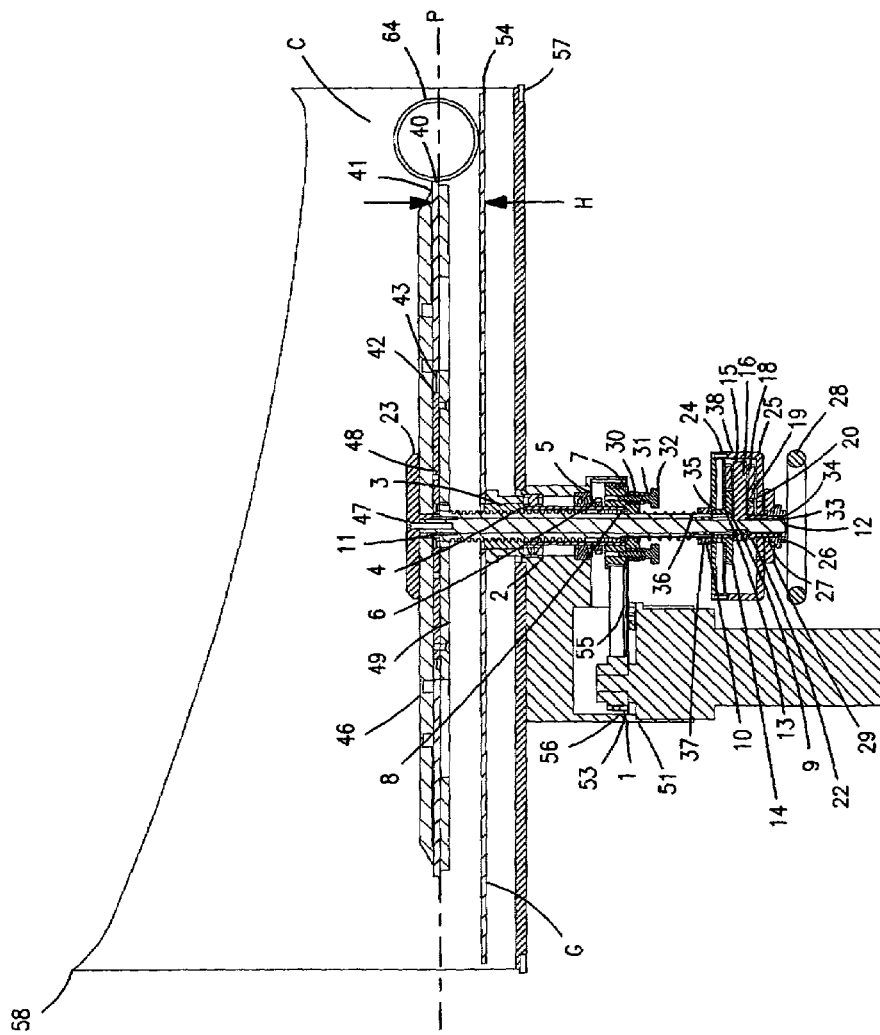
FIG. 11 is a view similar to FIG. 10 showing the sorter disc adjusted diametrically and height wise to accommodate a larger diameter bottle.

Considering now more specific details of the sorter disc assembly (Ds) and with specific reference to FIGS. 6-9 inclusive, the sorter disc assembly (Ds) comprises a generally circular support disc (40), an actuator disc (41) of circular shape overlying the support disc (40) and a plurality of pie-shaped disc segments or sections (43) engaging between the confronting faces (40a,41a) of the support and actuator discs (40,41). The discs incorporate means for displacing the pie-shaped disc sections (43) radially inwardly and outwardly upon relative rotation of the support disc (40) and actuator disc (41) to selectively change or vary the overall diameter of the sorter disc assembly (Ds) and thus provide a means for varying the radial gap (G) of the bottle conveyor channel (C) between the outer peripheral edge (E) of the sorter disc assembly ($D_s$) and the wall 58 of the bowl (B). This varies the width or radial gap (G) of the channel (C) to accommodate bottles B of different diameters as illustrated in FIGS. 10 and 11. The discs are provided with integrated cam and slot means including a series of arcuate grooves (41a) and a series of radially extending slots (40a, 40b) in the inner face (41a) of the actuator disc (41). The support disc (40) mounts studs (44,45) which engage in the grooves and slots thereby guiding the pie-shaped disc segments to move inwardly and outwardly in a truly radial direction.

Considering more specifically the details of the sorter disc assembly (Ds), the support disc (40) has a series of three evenly spaced parallel slots (40a, 40b) of the same length (see FIGS. 7) which are arranged to allow the center slot (40a) to be offset towards the center of the support disc (40). The parallel slot patterns are arranged radially around the support disc (40) at equal spacing to provide guidance for the radial movement of the adjustable pie shaped disc segments (43). Shoulder studs (44, 45) of various lengths are threaded into the pie-shaped disc segments (43), at points corresponding to the end point of each slot (40a, 40b) (FIG. 7) of the slot patterns. One shoulder stud (45) engages within slot (40b) (see FIG. 7) to provide guidance and displacement. Two of the shoulder studs (45) of even length are threaded into holes that correspond to the two outer slots (40b) in the adjustable support disc (40) do not extend beyond the surface of the adjustable disc segments (43). A third shoulder stud (44) engages through the adjustable disc section (43) and protrudes past the top surface of the disc to allow mounting of the pivot sleeve (46) as illustrated in FIG. 9. The arcuate outer edge (43a) of the adjustable disc section (43) consists of multiple radial profiles to lessen the effects of the different radii achievable after an adjustment has been made in the outer profile of the adjustable sorter disc assembly. Each pie shaped segment (43) has a stepped side edge portion ($43^b$) to provide a nesting action when displaced to present a generally circular outer profile for the array of pie shaped segments in a stacked inner limit position and a fanned outer limit position. The stepped side edge portion is beveled as at ($43^a$) to prevent hang up of square shaped containers and insure smooth flow of containers to the channel (C) during the tumbling action. The surface cuts also allow for a continuous edge to be presented to the containers in plane P-P (see FIG. 10).

Figure 7:
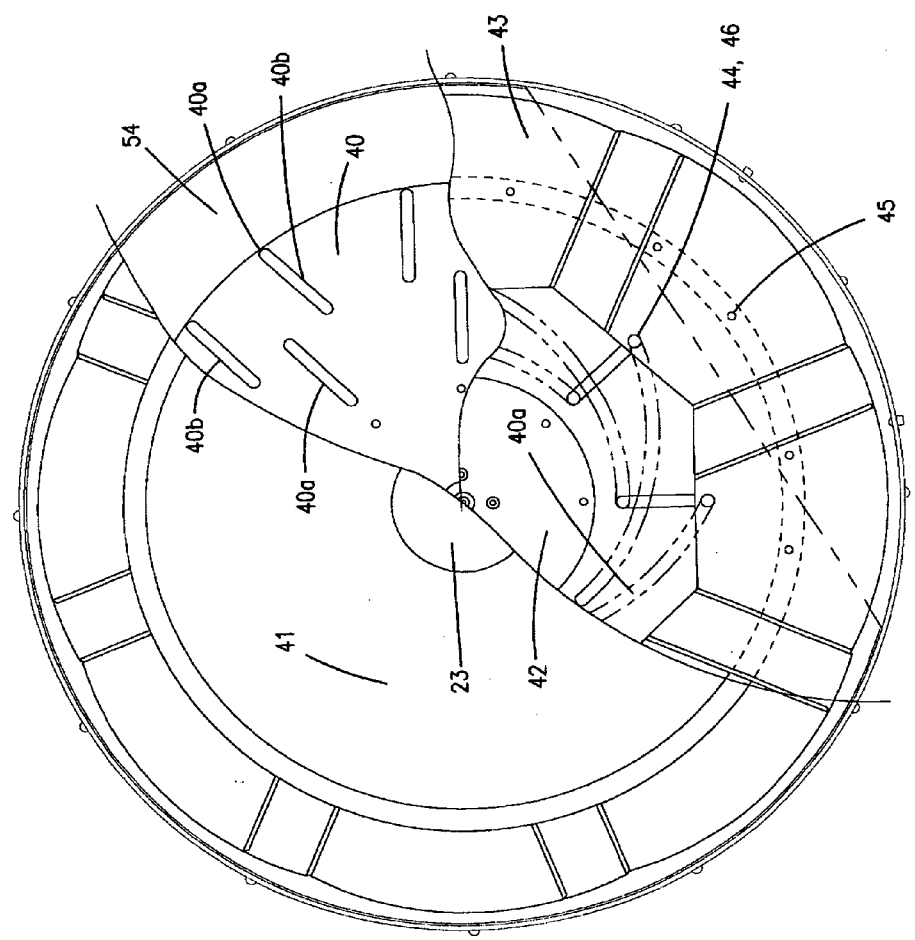
FIG. 7 is a top plan view of the adjustable sorter disc assembly showing the adjustable pie segments and the slot and cam arrangement for adjusting the pie sections radially to selectively vary the radial gap of the channel for bottles.

The inner most studs (45) protrude through the adjustable pie-shaped disc segments (43) to accommodate pivot sleeve (46) which engages one of the spiral grooves (41a) in the actuator disc (41) which as illustrated in FIG. 9 begin at a radii of the slots equal to the inner most radiuses of the slots in the support disc (40). The spiral groove (41a) has a radius equal to adjustment range designated by the length of the slots in the adjustable support disc (40). The length of the spiral groove (41a) is 90 degrees in length, with the center point of the arc being off center to the center point of the actuator disc (41) and adjustable support disc (40). The start point (41b) of the spiral groove (41a) correspond to the inner most end of the offset center slot (Y) (FIG. 7) in the adjustable support disc (40), the opposite end of the arc corresponds to the outer most point of the center-offset slot (Y) (FIG. 7). By this arrangement, it is only necessary to turn the hand wheel one revolution for full range of adjustment of the disc assembly.

Figure 20:
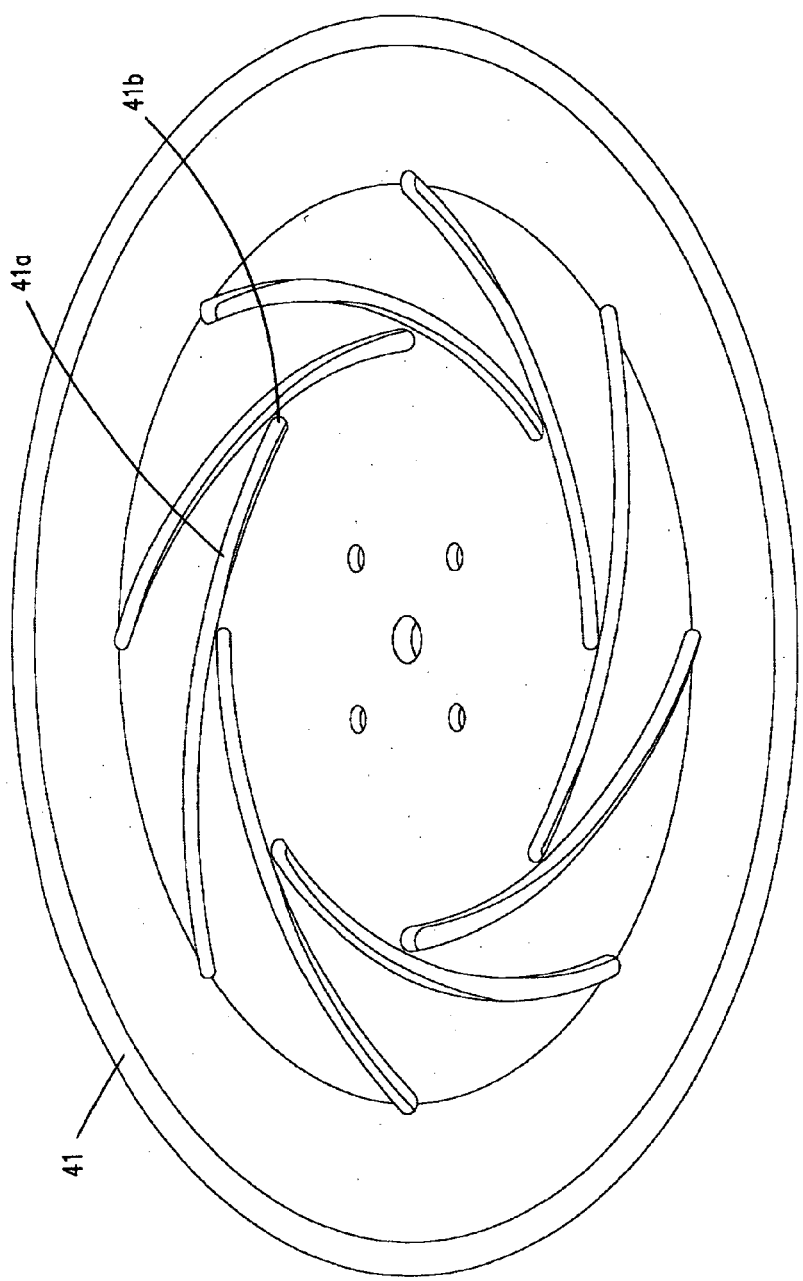
FIG. 20 is a perspective view of the inside face of the actuator disc showing the arcuate control grooves which is part of a system controlling radial displacement of the pie-shaped segments when the discs are rotated relative to one another.
Figure 21:
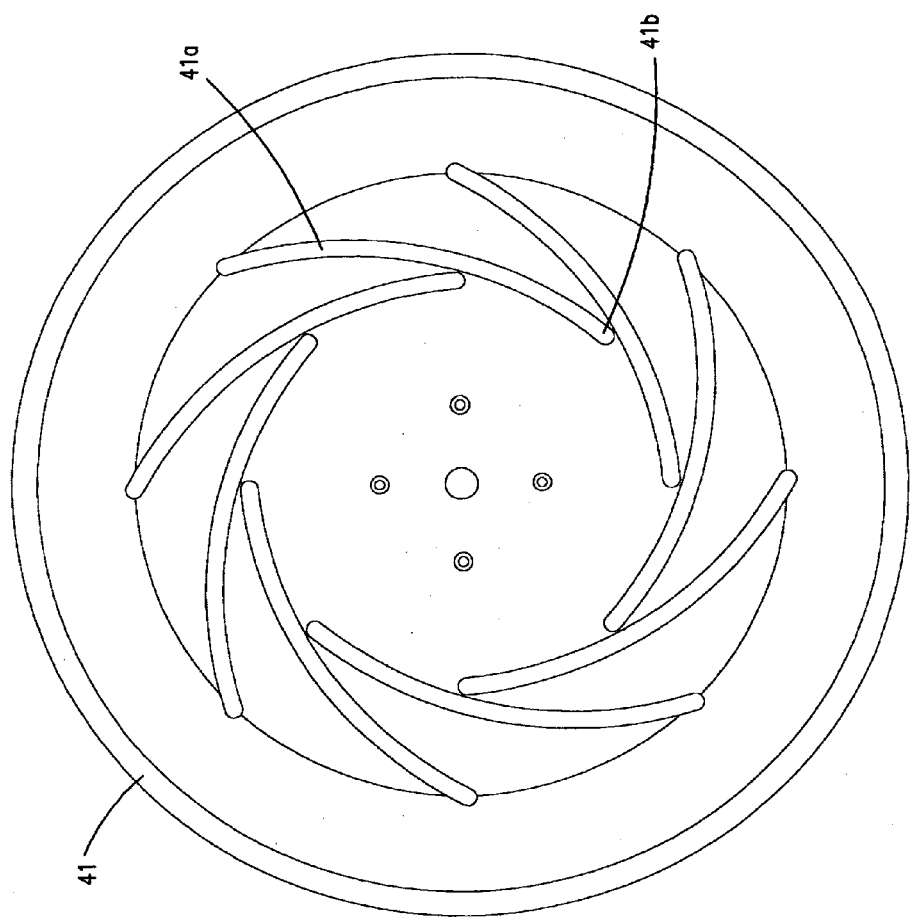
FIG. 21 is a better plan view of the actuator disc.
Figure 22:
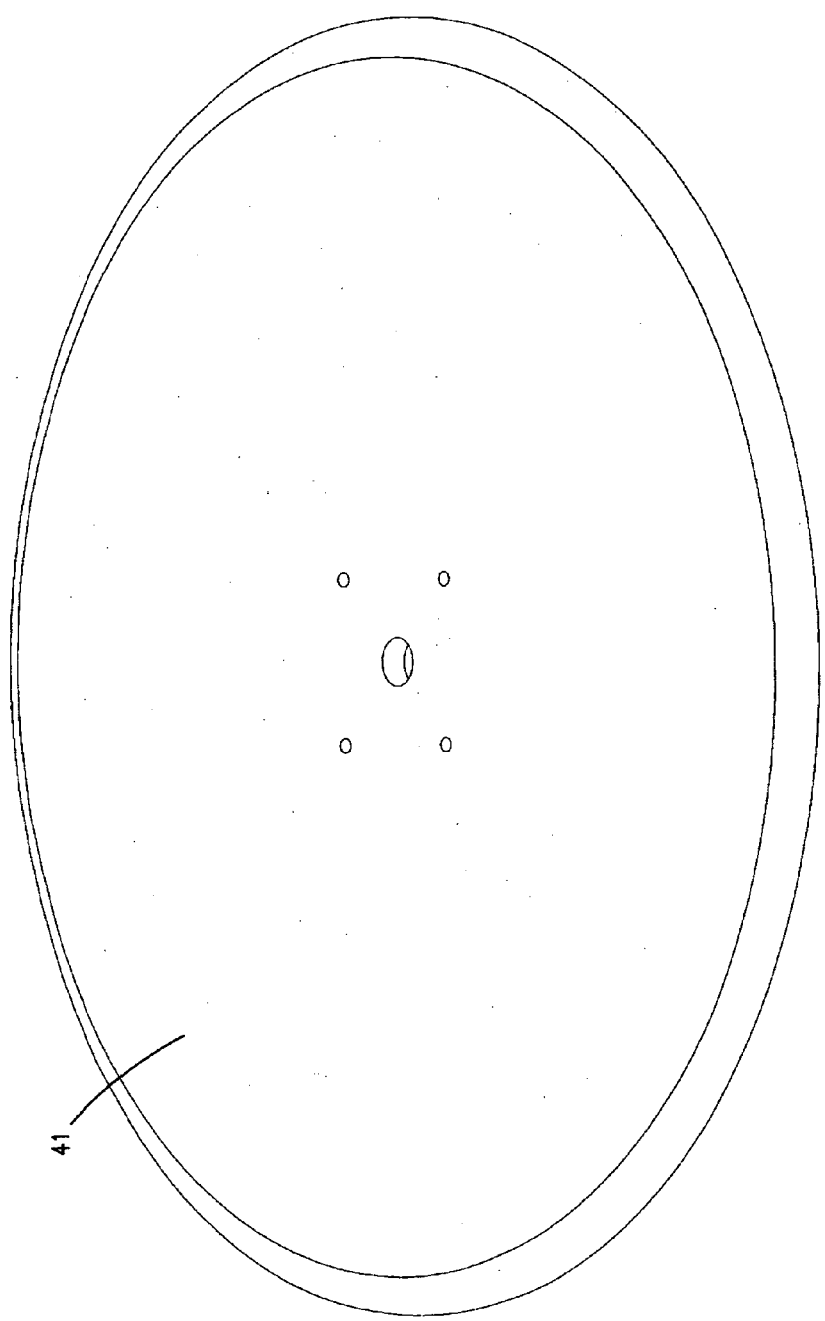
FIG. 22 is a perspective view of the actuator cap.
Figure 23:
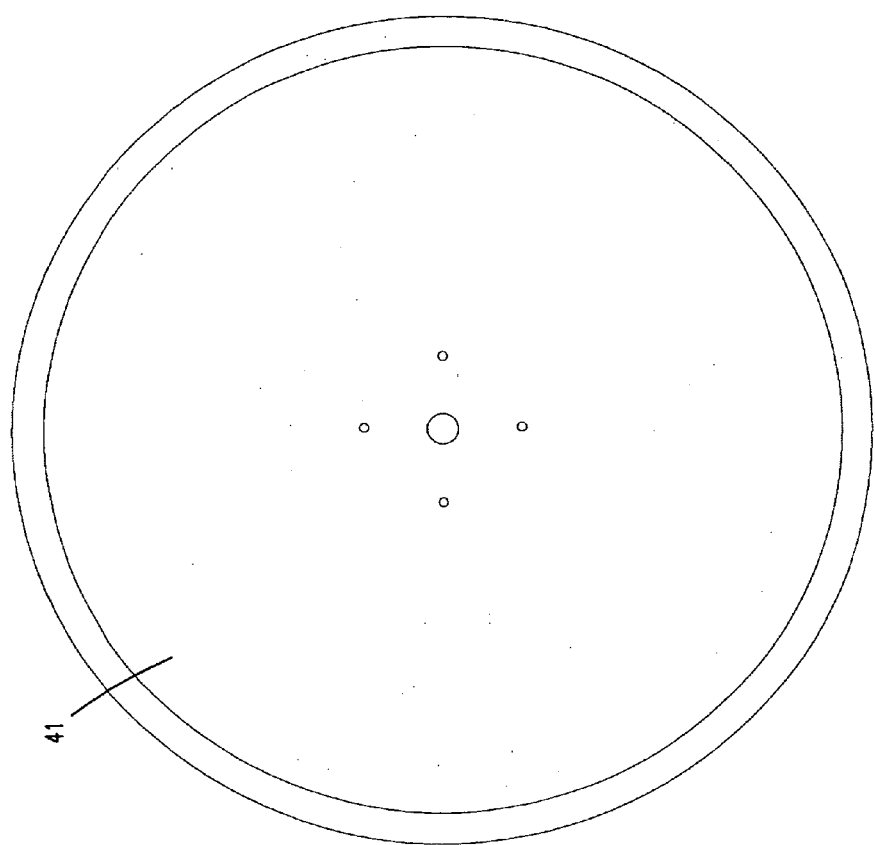
FIG. 23 is a top plan view of the actuator cap.

Considering now the details of the actuator system for adjusting the sorter disc assembly ($D_s$) including its connection and operation, the actuator disc (41) is rotated around the disc center by an elongated actuator shaft (12), which passes through height adjusting screw (9) to which the adjustable support disc (40) is attached. Connection of actuator shaft (12) to the actuator disc (41) is through the actuator cap (23) which is bolted to the actuator disc (41) and the actuator shaft cap (23). A triangular extension (12a) on the actuator shaft (12) and a corresponding triangular receptacle (23a) within the actuator cap (23) (FIG. 20), provide a one way drive connection. Turning the height adjusting screw (9) and the actuator shaft (12) in opposite directions, rotations, in turn the actuator disc (41). As the actuator disc (41) rotates, the pivot sleeves (46) are driven inward or outward through their engagement with the spiral channels (41a) within the actuator disc (41) allowing the pivot sleeve (46) to drive the adjustable disc sections (43) through the slots (40a) of the support disc (40), guided by the shoulder studs (44,45), radially inwardly or outwardly to selectively change the diameter of the generally circular outer profile (43a) of the disc assembly ($D_s$).

To implement an adjustment to the outer diameter, the actuator disc is rotated through its connection with the actuator shaft (12) and actuator cap (23). The actuator shaft (12) rides on needle bearings (10, 11) pressed into the height adjusting screw (9). The means of rotating the actuator shaft (12) and height adjusting screw (9) in opposite direction comprises an adjuster sprocket (26), which is rotated around the lower section of the actuator shaft (12) on flanged sleeve bearings (27) pressed into the adjuster sprocket (26).

Figure 27:
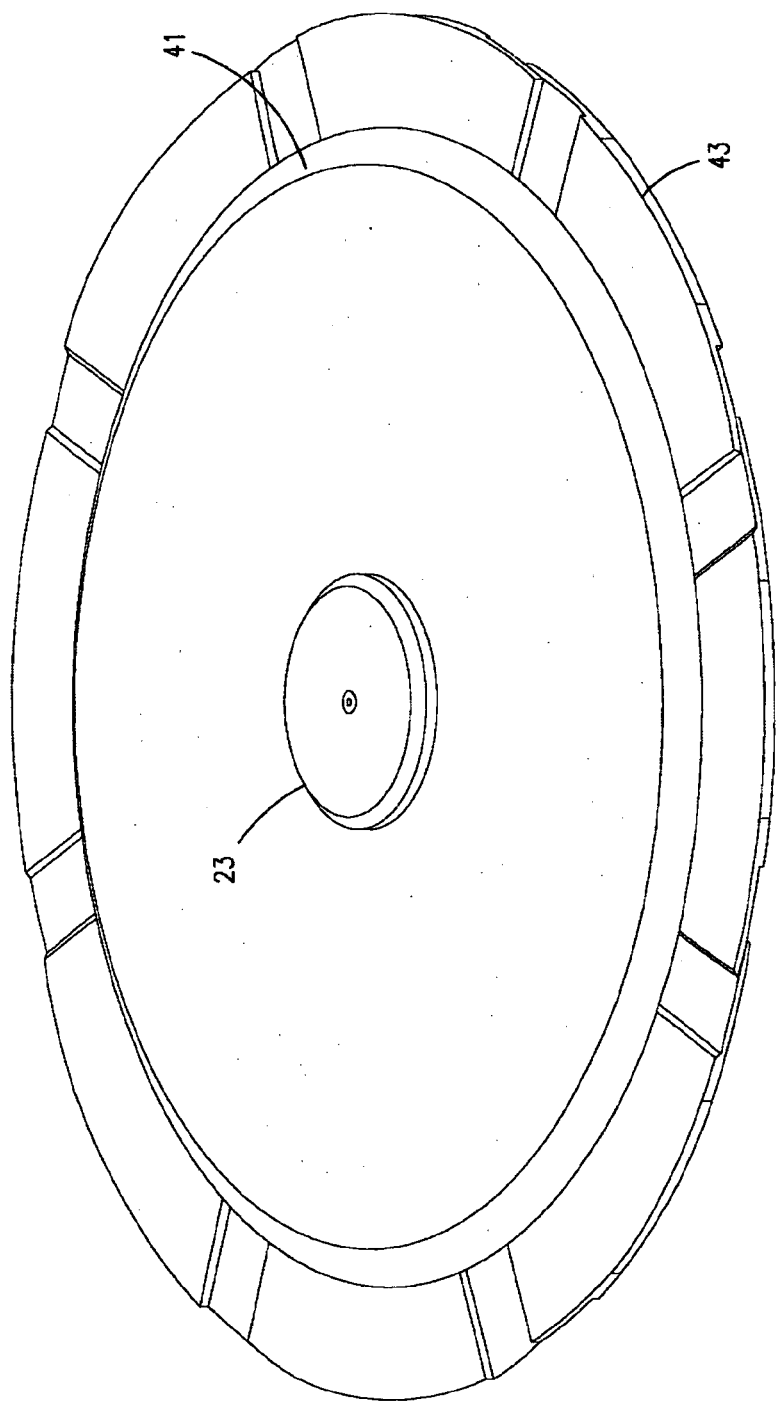

The adjuster sprocket (26) slides onto the lower section of the actuator shaft (12) and passes through the actuator locking disc (25) and plunger disc (29). The actuator hand wheel (28), plunger disc (29) and adjuster sprocket (26) are bolted together. The bolts pass through the plunger disc (29), actuator hand wheel (28) and then thread into the adjuster sprocket (26). The pin nose of actuator locking pin (31) mounted into the plunger disc (29), engages one in a series of radial holes (25a) in the actuator locking disc (25) (FIG. 27) in its released or extended state. By this engagement of the actuator locking pin (31) in the holes (25a) of the actuator-locking disc (25), the adjuster sprocket is locked in position. By retracting the actuator locking pin (31) by pulling the knurled knob of the actuator locking pin (31) outwardly, the actuator locking pin (31) disengages the actuator-locking disc (25), allowing rotation of actuator hand wheel (28), plunger disc (29) and adjuster sprocket (26). Once the actuator locking pin (31) has cleared the surface of the actuator-locking disc, the actuator hand wheel (28) can be rotated clockwise or counterclockwise to adjust the actuator disc (41), extending or retracting the adjustable disc segments (43) and effectively changing the overall sorter disc diameter.

Rotation of the adjuster sprocket (26) turns the idler sprocket (19), which in turn rotates a square drive spur gear (18a) and the spur gear shaft (17), which the square drive spur gear (18a) is connected, through flanged sleeve bearings (16) pressed into the disc actuator arm (15). A second square drive spur gear (18b) is attached the spur gear shaft (17), on the opposite side of the disc actuator arm (15). The second square drive spur gear (18b) engages a larger modified 3.00 spur gear (14) secured to the lower end of the height adjusting screw (9). By sizing the square drive spur gears (18a, 18b), idler sprocket (19) and larger modified 3.00 spur gear (14) in a predetermined manner a force ratio reduction of 4:1 is produced easing rotation of the actuator disc (41) through the handwheel (28). The disc actuator arm (15) is attached to the actuator shaft (12) by means of a key (22) and keyway (K) in both the disc actuator arm (15) and the actuator shaft (12). As the actuator handwheel (28) is rotated, through the attachment to the adjuster sprocket (26), the disc actuator arm (15) is rotated around larger modified 3.00 spur gear (14) producing a push/pull movement between the actuator shaft (12) and the height adjusting screw (9). This push/pull movement prevents the complete assembly from rotating as the actuator handwheel (28) is rotated and provides the drive to rotate the actuator disc (41), which generates the radial movement of the adjustable pie shaped disc segments (43), varying the outer diameter of the adjustable sorter disc assembly ($D_s$).

The actuator-locking disc (25) contains a singular slot through the outer surface, which extends for 90 degrees and provides a window to limit travel of the ⅛" dowel pin (39). The dowel pin (39) is pressed into the end surface of the disc actuator arm (15) on center corresponding to the position of the keyway (K) in the actuator arm (15) and actuator shaft (12). A ½" wide adhesive scale-metric (38) on the outer surface of the actuator-locking disc (25) directly above the radial slot provides a means of measuring or displaying the actuator disc (41) movement. The metric scale is related to the radial gap (G) of channel (C) to provide visual indica to the operator for adjusting the gap for a given bottle (B).

Height Adjustment

Figure 24:
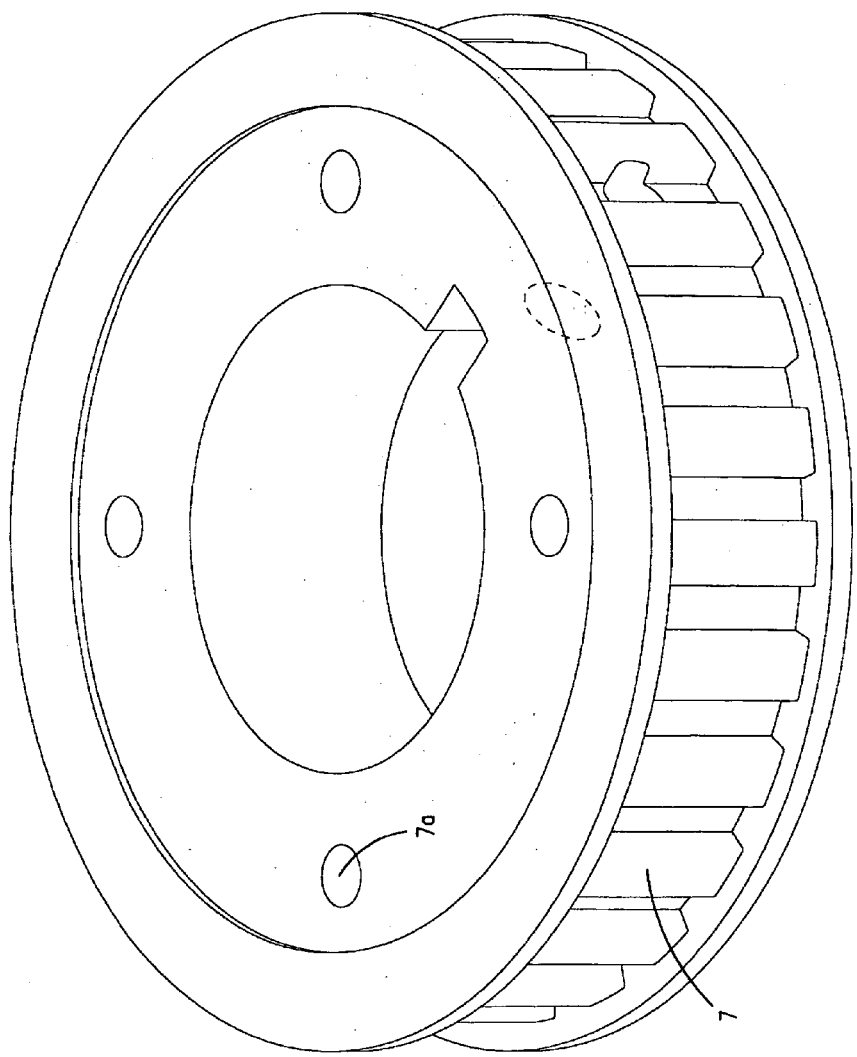
FIG. 24 is a perspective view of the modified drive pulley.
Figure 25:
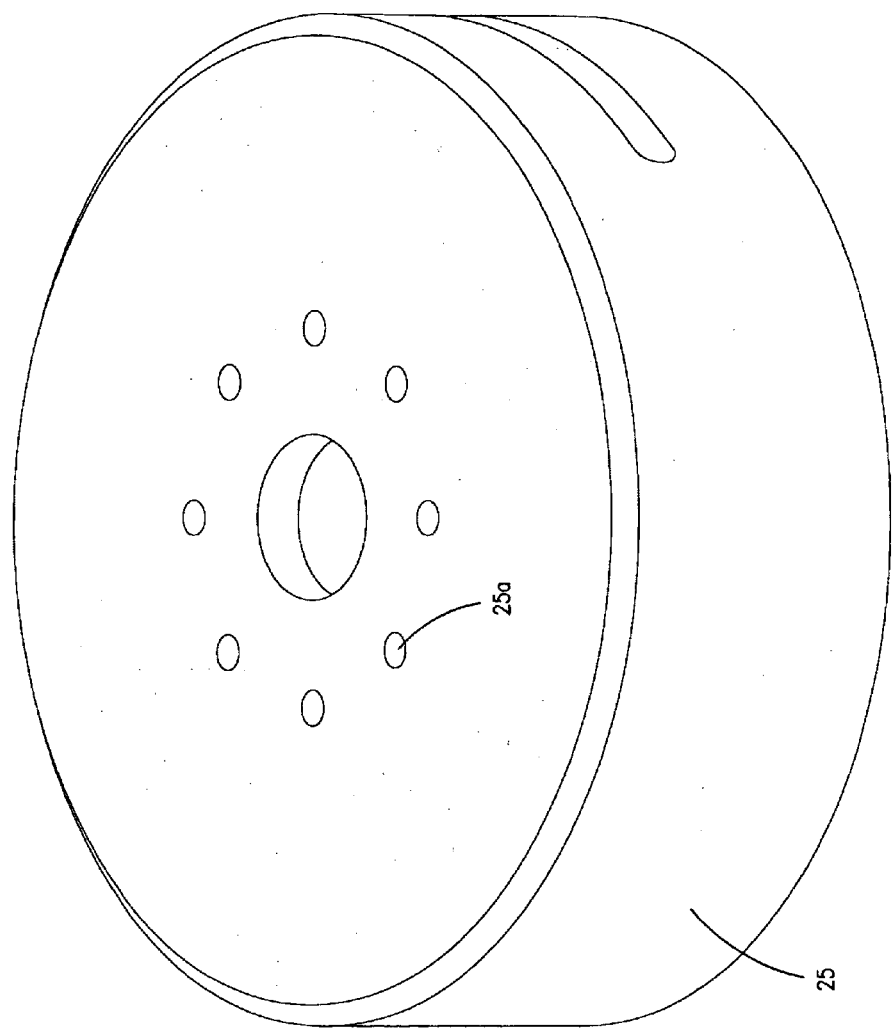
FIG. 25 is a perspective view of the actuator locking disc.
Figure 26:
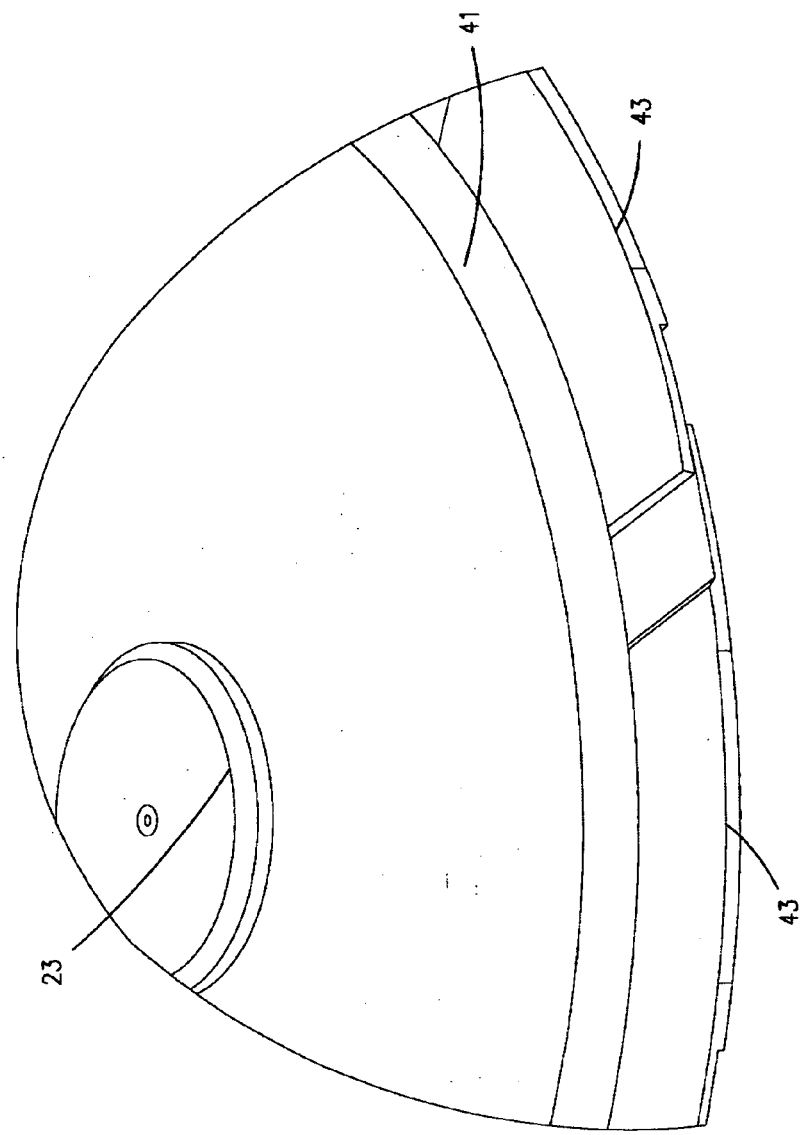
FIGS. 26 and 27 are other views showing the actuator disc 41 and pie shaped segments 43.

The sorter disc assembly ($D_s$) is also adjustable in an axial direction so that the height (H) of the channel (C) between the sorter disc assembly ($D_s$) and drive plate (54) can be selectively varied for bottles of different diameters and cross section. As noted above for a given container or bottle size, the arcuate outer edge (43a) of the sorter disc assembly ($D_s$) preferably lies in a plane P-P through the axis of the bottle and parallel to the base of the channel (C). This plane P-P generally passes through the diameter or greatest cross section of the container or bottle (B). To adjust height (H) therefore, the mechanism includes a height adjusting hub (3) mounted in the sorter disc bearing hub (1) with two 40 mm roller bearings (2), AFBMA lock washer (5) and AFBMA lock nut (6) to allow for high speed rotation that occurs during the orienting process. The flange (3a) of height adjusting hub (3) is counter-bored and threaded to accept a modified round nut (4) which the height adjusting screw (9) threads through at the top of the height adjusting hub (3). A needle bearing (8) pressed into the lower bore of the height adjusting hub (3) provides additional support to the height adjusting screw (9). Additionally, the height adjusting hub (3) extends beyond the surface of the A FBMA lock nut (6) to accept the timing belt sprocket (7), which has a series of holes (7a) (FIG. 24) to accept the pin nose of a height adjustment locking pin (32) threaded into the conjoined plunger locking ring halves (30). A timing belt (56) engages around a modified timing belt sprocket (7) and the drive pulley (53) on the drive motor (52), provide drive to the complete assembly and the resistence needed for incorporating the height adjustment.

Height adjustment is achieved by rotating the height adjusting screw (9) in the round nut (4), threaded in the height adjusting hub (3). The round nut (4) height adjusting hub (3) and the height adjusting screw (9) have the same thread size and screw one into the other. With the pin nose of a height adjustment locking pin (32) threaded into the plunger disc (29) disengaged from radial holes (7a) in the modified timing belt pulley (7), rotational force applied to the actuator hand wheel (28) is utilized as the driving force to implement a height adjustment.

The height adjusting screw (9) has three flats of limited length which determines the height adjustment range, below the threaded portion of the height adjusting screw (9). The flats in the height adjusting screw (9) extend adjacent to the lower section of the shaft, the last approximate inch of the shaft remains round for mounting the larger modified 3.00 spur gear (14).

Two plunger locking ring halves (30) with height adjustment locking pin (32) threaded in each half and are bolted together to fully encompass the height adjusting screw shaft. The conjoined plunger locking ring halves (30) encompass the section of the height adjusting screw (9) containing the surface flats and prevent the height adjusting screw from rotating when the pin nose of a height adjustment locking pin (32) engages the holes (7a) in the modified timing belt sprocket (7). Bolted together the plunger locking ring halves (30) provide minimal clearance to allow movement of the conjoined plunger locking ring halves (30) along the length of the flats of the height adjusting screw (9). Additionally, the engagement of the corresponding surfaces of the conjoined plunger locking ring halves (30) and height adjusting screw (9) transfer the drive force from the modified timing belt sprocket (7) to the lower section of the assembly. A compression spring (36) under the joined plunger locking ring halves (30), and around the height adjusting screw (9), provides additional force to the plunger locking ring halves (30) to ensure the pin nose of a height adjustment locking pin (32) remains engaged in the holes in the modified timing belt sprocket (7). The opposite end of the compression spring (36) seats in the spring retention ring (35) which covers the top of the larger spur gear (23).

By engaging the pin nose of actuator locking pin (31) in the actuator-locking disc (25), and releasing the pin nose of height adjustment locking pin (32) from the holes (7a) in the modified timing belt sprocket (7), the adjuster mechanism can be rotated in either direction to raise or lower the height adjusting screw (9), which in turn raises or lowers the sorted disc assembly ($D_s$) relative to the plate (54) (compare FIGS. 10 & 11) and thereby vary the height (H) for a given bottle (B). Releasing the height adjustment locking pin (32) into the conjoined plunger locking ring halves (30) with the pressure from the compression spring (36) re-engages adjustment locking pin (32) in the modified timing belt sprocket (7), locking the height adjustment (H).

Indication of the height (H) is displayed on metric scale tape (37) adhered to the center flat on the height adjusting screw (9).

Cycle of Operation

When the machine has been set for handling containers of a given size, the height adjustment pin (32) and the radial gap pins (31) are in a locked or engaged position to lock the mechanism which establishes a driving connection between the sprocket (7) and the motor output shaft via belt (56) which in turn rotates the sorter disc assembly (Ds) to unscramble bottles fed to the bowl B and deliver them to the discharge chute in the manner described previously.

When it is desired to run a different size container, the system and apparatus of the present invention can be very quickly and easily adjusted to make the necessary changes in the configuration of channel (C) to accommodate the next run of containers. This is done by selectively changing the height (H) and radial gap (G) of the channel (C).

Height Adjustment

Figure 12:
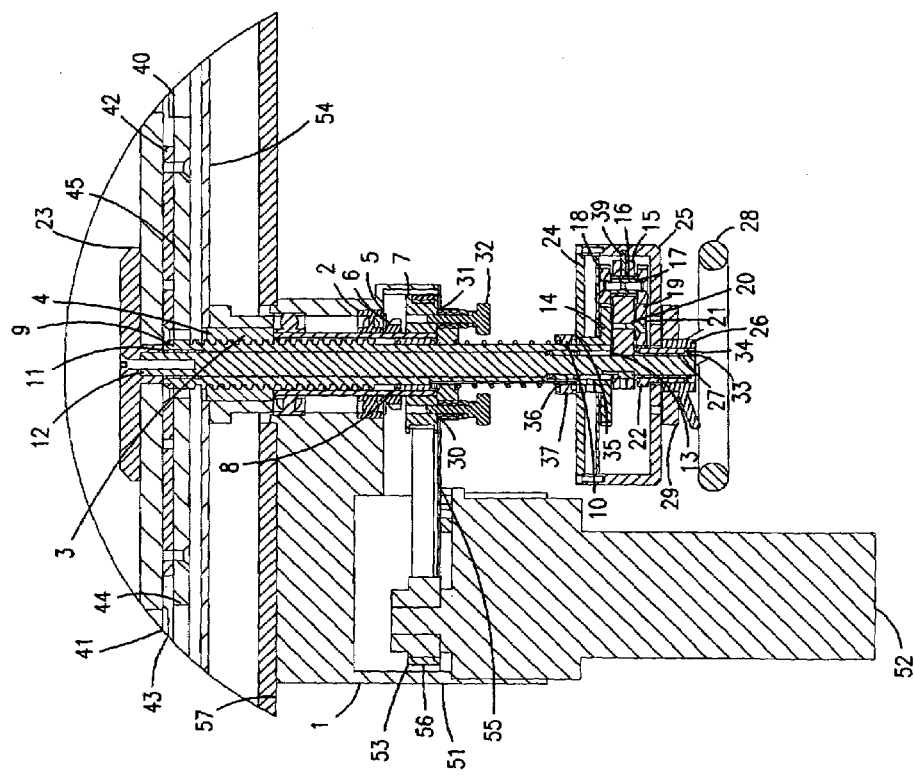
FIG. 12 is a section similar to FIGS. 10 and 11 enlarged to show details of the actuator mechanism more clearly.
Figure 13:
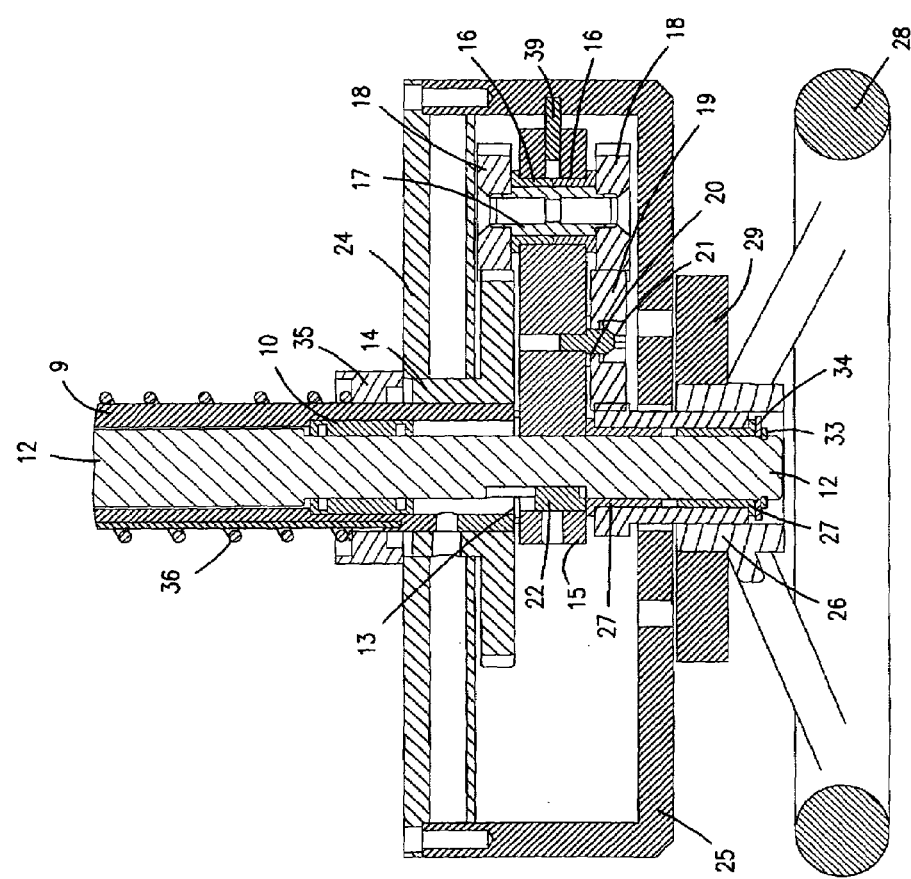
FIG. 13 is a fragmentary sectional view showing the gear reduction mechanism forming part of the system for selectively displacing the pie segments radially to adjust the radial gap of the channel.
Figure 15:
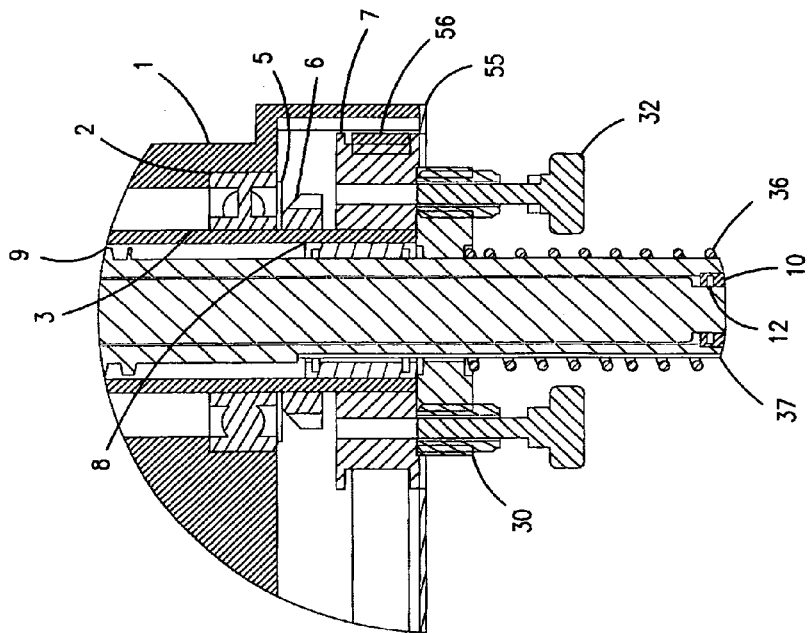
FIG. 15 is a fragmentary sectional view similar to FIG. 14 with the height adjustment pins in a release or unlocked position whereby rotation of the hand wheel permits relative rotation of the sorter disc assembly and internally threaded nut (4) for height adjustment of the channel.
Figure 17:
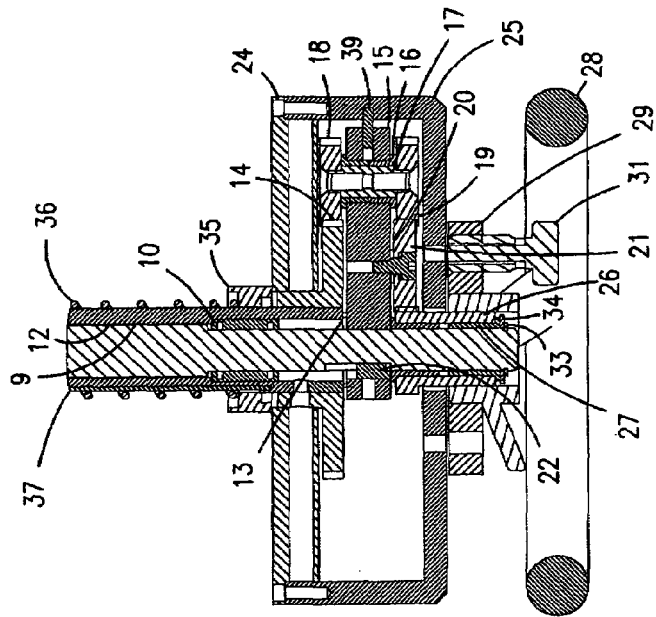
FIG. 17 is a view similar to FIG. 17 showing the radial gap control pin in a locked position for normal operation of the tumbler.

In order to adjust the height (H) between the sorter disc assembly (Ds) and the drive plate (54) the height adjustment pins (32) are pulled back to a release position and the radial adjustment pins (31) are left engaged to lock the actuator disc (25) (see FIGS. 15 and 17). Turning of the hand wheel (28) in a clock wise direction will produce an increase in the height adjustment and rotation in a counter clock wise direction will produce a decrease. Specifically, rotation of the hand wheel (28) imparts rotation to height adjustment screw (9) which in turn rotates actuator mounting disc (24) which mounts actuator locking disc (25). Spur gear (14) is secured to height adjustment screw (9) and mounts the actuator mounting disc (24) so that as the hand wheel is rotated, height adjustment screw (9), actuator shaft (12) and the sorter disc assembly (Ds) mounted on the outer end of the drive shaft (12) rotate in unison as a unit relative to internally threaded round nut (4) mounted in height adjusting hub (3) (see FIG. 12). The height adjustment screw and drive shaft rotate relative to the fixed hub (3) and the container drive plate (54) to thereby change the distance between the confronting faces of the sorter disc assembly (Ds) and drive plate (54) and thus the height (H) of channel (C) (See FIG. 12).

Radial Adjustment

Figure 14:
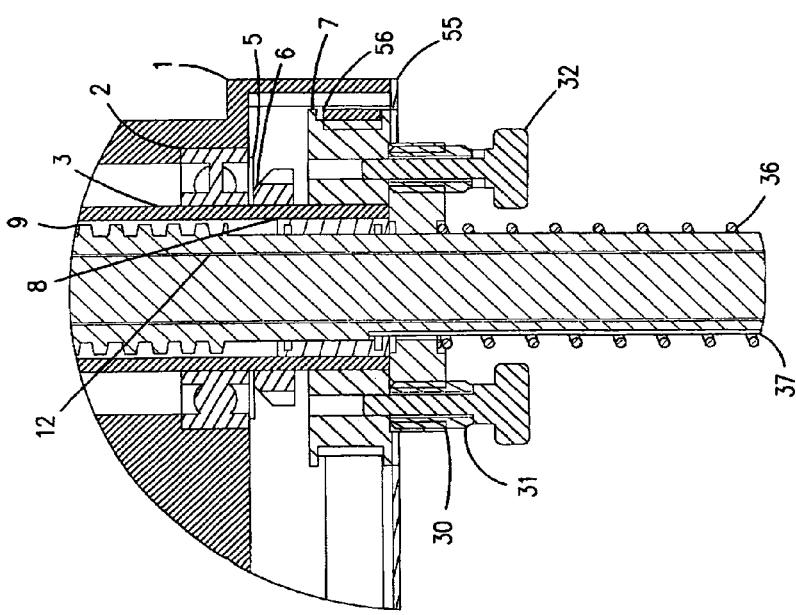
FIG. 14 is a fragmentary transverse sectional view of the sorter disc assembly actuating mechanism wherein the drive shaft and sleeve are in a locked position relative to the drive sprocket (4) whereby the belt drive rotates the sorter disc assembly for normal feeding operation of the bottles in the drum.
Figure 16:
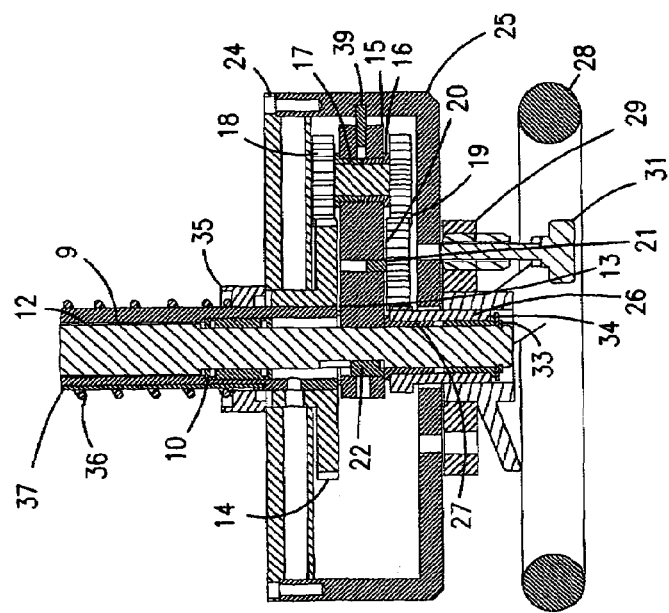
FIG. 16 is an enlarged sectional view through the actuator mechanism showing the radial gap adjustment pin in a release position whereby rotation of a handwheel produces relative rotation of the discs comprising the disc sorter assembly to thereby vary the radial gap of the channel or trackway for feeding the bottles through the unscrambler.
Figure 18:
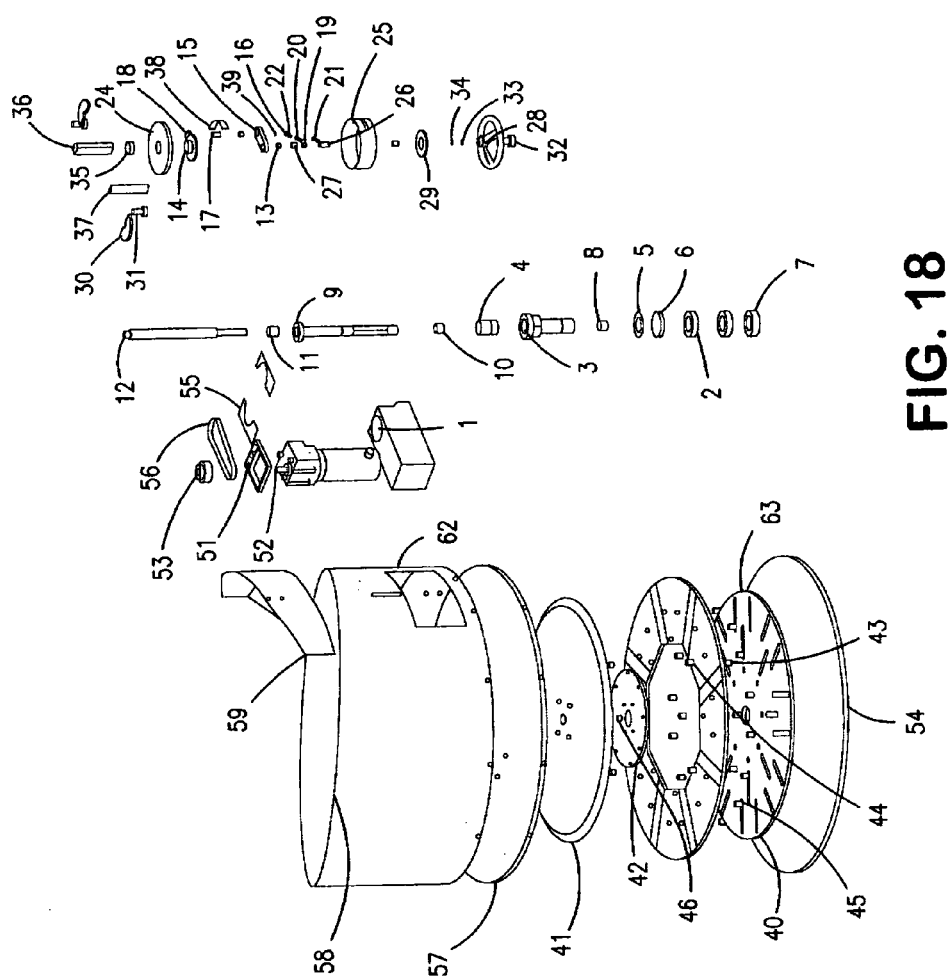
FIG. 18 is an exploded view showing the various elements comprising the bowl and the sorter disc assembly.
Figure 19A:
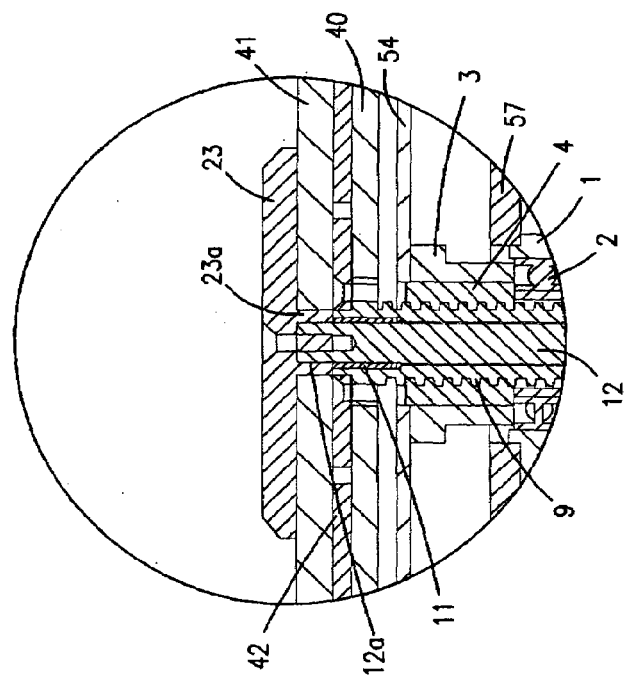
FIG. 19a is an enlarged sectional view of the portion circled in FIG. 18 showing the details of the mounting arrangement of the sorter disc assembly to the actuator shaft and disc spacer wherein the outer periphery defines the base of the bottle channel.
Figure 19:
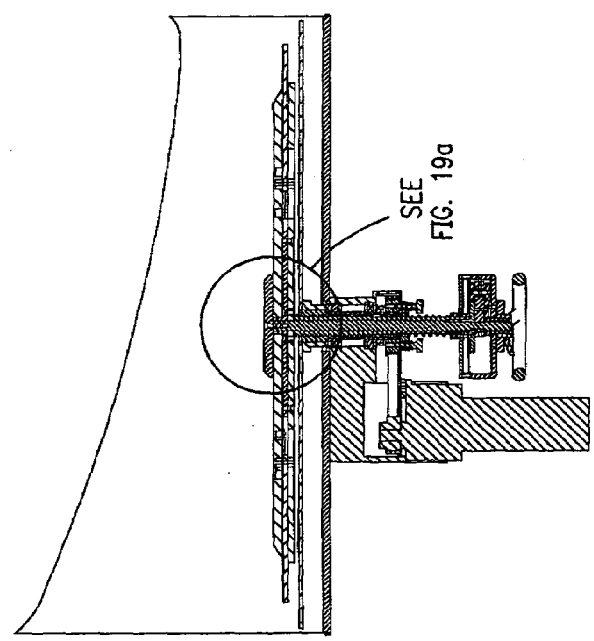
FIG. 19 is a transverse sectional view of the sorter bowl and discs and the actuator.

In order to adjust the radial gap (G), it is simply necessary to reset the height adjustment pins (32) into sprocket (7) to the locked position (See FIG. 14). Thereafter, pull the radial gap actuator locking pins (31) to a release position (See FIG. 16) thereby permitting rotation of the actuator hand wheel (28) which in turn rotates adjusting sprocket (26) and in turn rotates idler sprocket (19). This action rotates square drive spur gear (18) connected to spur gear shaft (17). Spur gear shaft (17) passes through actuator arm (15) to a second spur gear (18a) which rotates around a larger spur gear (14) secured to the height adjustment screw (9).

As sprocket (18) rotates around spur gear (14), it actuates arm (15) and actuator shaft (12) via keyways (K). Thus the actuator shaft (12) is rotated relative to the height adjustment screw (9).

The actuator disc (41) is mounted on the inner end of the actuator shaft (12) via cap (23). Disc (42) is mounted on the upper end of the height adjustment screw (9) and the support disc (40), through which the actuator shaft (12) passes. Therefore rotation of the shaft (12) as described above produces relative rotation of the support disc (40) and actuator disc(41)which in turn produces radial movement of the pie-shaped segments (43) via the arcuate displacement grooves (41a) and cam pins (46).

Even though particular embodiments of the invention have been illustrated and described herein, it is not intended to limit the invention and changes and modifications may be made therein within the scope of the following claims.

What is claimed is:

1. An apparatus for sorting containers comprising,
a bowl assembly consisting of a base and an upstanding generally cylindrical sidewall,
a support disc,
an actuator disc overlying said support disc,
a plurality of pie-shaped disc segments disposed in a circular array between said support disc and said actuator disc and,
means operatively connecting said actuator disc and said support disc so that relative rotation of said support disc and said actuator disc relative to one another effects radial movement of said pie-shaped disc segments, and
actuator means for selectively rotating said actuator disc and said support disc relative to one another to position said pie-shaped disc segments between inner and outer limit positions.

2. The apparatus as claimed in claim 1, including
a series of radially extending circumferentially spaced slots in a face of said actuator disc confronting said support disc,
a series of arcuate cam grooves in said support disc and confronting face, and
studs in said support disc engaging in said radial slots and said arcuate cam grooves whereby relative rotation of said discs produces displacement of said pie-shaped disc segments in a radial direction.

3. The apparatus as claimed in claim 1, wherein
each of said pie shaped disc segments includes an offset ledge which nests in a recessed portion in an adjacent pie-shaped disc segment so that the arcuate outer edge of said pie shaped disc segments provide a generally continuous circular edge which confronts and is spaced from the inner edge of the bowl assembly defining a flow channel for the containers.

4. The apparatus as claimed in claim 1 wherein said actuator means for selectively changing channel characteristics is located exterior to said bowl assembly for easy and safe access to adjust the channel characteristics when desired.

5. The apparatus as claimed in claim 1 wherein said actuator means includes a gear reduction unit providing a mechanical advantage to ease the force applied to said actuator means to effect displacement of said actuator disc and said support disc for adjusting movement relative to one another.

6. An apparatus for sorting containers comprising,
a bowl assembly consisting of a base and an upstanding generally cylindrical sidewall,
at least one disc,
a plurality of pie-shaped disc segments disposed in a circular array confronting a face of said disc,
inter-engaging Internal means operatively connecting said disc and said pie shaped disc segments, so that rotation of said disc effects radial movement of said pie-shaped disc segments and
actuator means for rotating said disc to selectively position said pie-shaped disc segments between inner and outer limit positions thereby providing means for selectively varying the channel between the outer periphery of said pie-shaped disc segments and said sidewall to accommodate containers of various sizes and shapes.

7. An apparatus for sorting containers comprising,
a bowl assembly consisting of a base and an upstanding generally cylindrical sidewall,
a sorter disc assembly comprising at least one actuator disc having a first face,
an array of pie shaped disc segments mounted in said bowl assembly and having a second face and an outer peripheral edge spaced from said generally cylindrical sidewall to define a continuous circumferentially extending channel for containers of a predetermined size and shape, and means comprising cam and cam follower elements in the confronting faces of said disc and said pie shaped disc segments whereby relative displacement of said disc and said pie shaped disc segments selectively varies the characteristics of the channel to accommodate containers of sizes and shapes different from said predetermined size and shape.

* * * * *